United States Patent [19]
Na

[11] Patent Number: 5,894,008
[45] Date of Patent: Apr. 13, 1999

[54] METHOD FOR MANUFACTURING AN ALUMINA-SILICON CARBIDE NANOCOMPOSITE

[75] Inventor: Seok Ho Na, Seoul, Rep. of Korea

[73] Assignees: Anam Industrial Co., Ltd., Seoul, Rep. of Korea; Amkor Electronics, Inc., Chandler, Ariz.

[21] Appl. No.: 08/951,890

[22] Filed: Oct. 16, 1997

[30] Foreign Application Priority Data

Dec. 30, 1996 [KR] Rep. of Korea ............ 96-77897

[51] Int. Cl.$^6$ ............................................. C04B 33/32
[52] U.S. Cl. .................... 264/661; 264/662; 264/667
[58] Field of Search ............................ 264/661, 662, 264/667, 676; 501/89

[56] References Cited

U.S. PATENT DOCUMENTS

| | | | |
|---|---|---|---|
| 3,979,214 | 9/1976 | Trostel, Jr. ................. | 106/44 |
| 4,889,835 | 12/1989 | Niihara et al. ............. | 501/89 |
| 5,009,822 | 4/1991 | Sacks et al. ............... | 264/23 |
| 5,123,935 | 6/1992 | Kanamaru et al. ........ | 51/309 |
| 5,286,684 | 2/1994 | Otsuka et al. ............. | 501/89 |
| 5,403,795 | 4/1995 | Koyama et al. ........... | 501/127 |
| 5,418,197 | 5/1995 | Brandt ....................... | 501/89 |
| 5,527,746 | 6/1996 | Otsuka et al. ............. | 501/89 |

*Primary Examiner*—Christopher A. Fiorilla
*Attorney, Agent, or Firm*—Skjerven, Morrill, MacPherson, Franklin & Friel LLP; Alan H. MacPherson

[57] ABSTRACT

A method of manufacturing an alumina-silicon carbide nanocomposite having particular application to improved ball bonding capillaries of a wire bonding device produces a structure with a 93–98 volume percent of α-alumina having an average diameter of 0.1–0.3 μm, a 2–7 volume percent of β-silicon carbide having an average diameter of 0.1–1.5 μm, a bending strength of 340–550 Mpa, and a toughness of 3.3–4.1 Mpam$^{1/2}$.

4 Claims, 4 Drawing Sheets

1

METHOD FOR MANUFACTURING AN ALUMINA-SILICON CARBIDE NANOCOMPOSITE

BACKGROUND OF THE INVENTION

1. Field of the Invention

The present invention relates, in general, to an alumina-silicon carbide nanocomposite for ball bonding capillaries of a wire bonding device and method of manufacturing such an alumina-silicon carbide nanocomposite and, more particularly, to an alumina-silicon carbide nanocomposite, having high strength and toughness and being preferably used for ball bonding capillaries of a wire bonding device, the bonding device used for electrically connecting conductive traces to the input/output pads of a semiconductor chip during a semiconductor package manufacturing process.

2. Description of the Prior Art

As well known to those skilled in the art, an automatic wire bonding device in the fabricating processes of semiconductor packages is used for electrically connecting a lead frame, ceramic circuit board, printed circuit board, etc., which is used as an outer connecting passage of a package, to input/output pads or dies of a semiconductor chip with gold or aluminum wires. In such an automatic wire bonding device, a ball bonding wire, having a thickness of 1.0–1.3 mil(1 mil=1/1000 inch), is received into the fine hole of a capillary which is requisite for wire bonding processes. In such a wire bonding process, the capillary is primarily heated to about 200° C. with a heat source. The capillary is secondly heated to about 270° C. with vibrations of ultrasonic waves, which are generated by a transducer. The capillary is also operated under a discharge state caused by a high voltage discharge blade, thus forming bonding balls. That is, the capillary has to be subjected to a coarse atmosphere during a wire bonding process so that the capillary has to be made of ceramic, suitable for enduring such a coarse atmosphere.

A sintered alumina($Al_2O_3$) having a purity of 99.99% or more, has been used for such a ceramic capillary. Such a pure sintered alumina preferably has a high strength of about 330 MPa and is suitable for conserving the manufacturing cost of capillaries. However, such an alumina has a low rupture toughness of about 3.0 $MPam^{1/2}$, thus deteriorating the operational reliability of resulting capillaries. Also, the durability of the alumina is deteriorated at a high temperature because the strength of the alumina is rapidly reduced at such a high temperature. Therefore, the life span of such a pure sintered alumina is shortened due to such a thermally reduced strength, thus increasing the manufacturing cost of packages.

SUMMARY OF THE INVENTION

Accordingly, the present invention has been made in view of the above problems occurring in the prior art, and an object of the present invention is to provide an alumina-silicon carbide nanocomposite for ball bonding capillaries, having a good operational reliability and durability with improved mechanical properties such as an improved strength, toughness and hardness, thereby increasing the expected life span of the alumina.

Another object of the present invention is to provide a method of manufacturing such an alumina-silicon carbide nanocomposite.

In order to accomplish the first object, the present invention provides an alumina-silicon carbide nanocomposite for ball bonding capillaries of a wire bonding device, comprising: 93–98 volume percent of α-alumina having an average diameter of 0.1–0.3 μm; and 2–7 volume percent of α-silicon carbide having an average diameter of 0.1–1.5 μm, so that said alumina-silicon carbide nanocomposite has a bending strength of 340–550 MPa and a toughness of 3.3–4.1 $MPam^{1/2}$.

In order to accomplish the second object, the present invention provides a method of manufacturing an alumina-silicon carbide nanocomposite for ball bonding capillaries of a wire bonding device, comprising the steps of: mechanically mixing 93–98 volume percent of α-alumina, having an average diameter of 0.1–0.3 μm, and 2–7 volume percent of β-silicon carbide, having an average diameter 0.1–1.5 μm, in a dispersal organic solvent for 0.5–4 hours through a ball milling process; drying said dispersal organic solvent of the mixture, thus forming dried powder; filtering said dried powder by a screen; pressurizing the filtered powder in a mold at a pressure of 2500–3500 psi, thus preforming the filtered powder into a preformed material; forming the preformed material at a pressure of 45000–55000 psi for 1.5–3 minutes through a cold hydrostatic pressurizing process, thus forming a formed material; and sintering the formed material at a temperature of 1600–1800° C. and at an atmospheric pressure for 3–5 hours under an inert atmosphere, thus forming an alumina-silicon carbide nanocomposite having a bending strength of 340–550 MPa and a toughness of 3.3–4.1 $MPam^{1/2}$.

BRIEF DESCRIPTION OF THE DRAWINGS

The above object, and other features and advantages of the present invention will be more clearly understood from the following detailed description taken in conjunction with the accompanying drawings, in which.

DESCRIPTION OF THE PREFERRED EMBODIMENT

Figure 1:
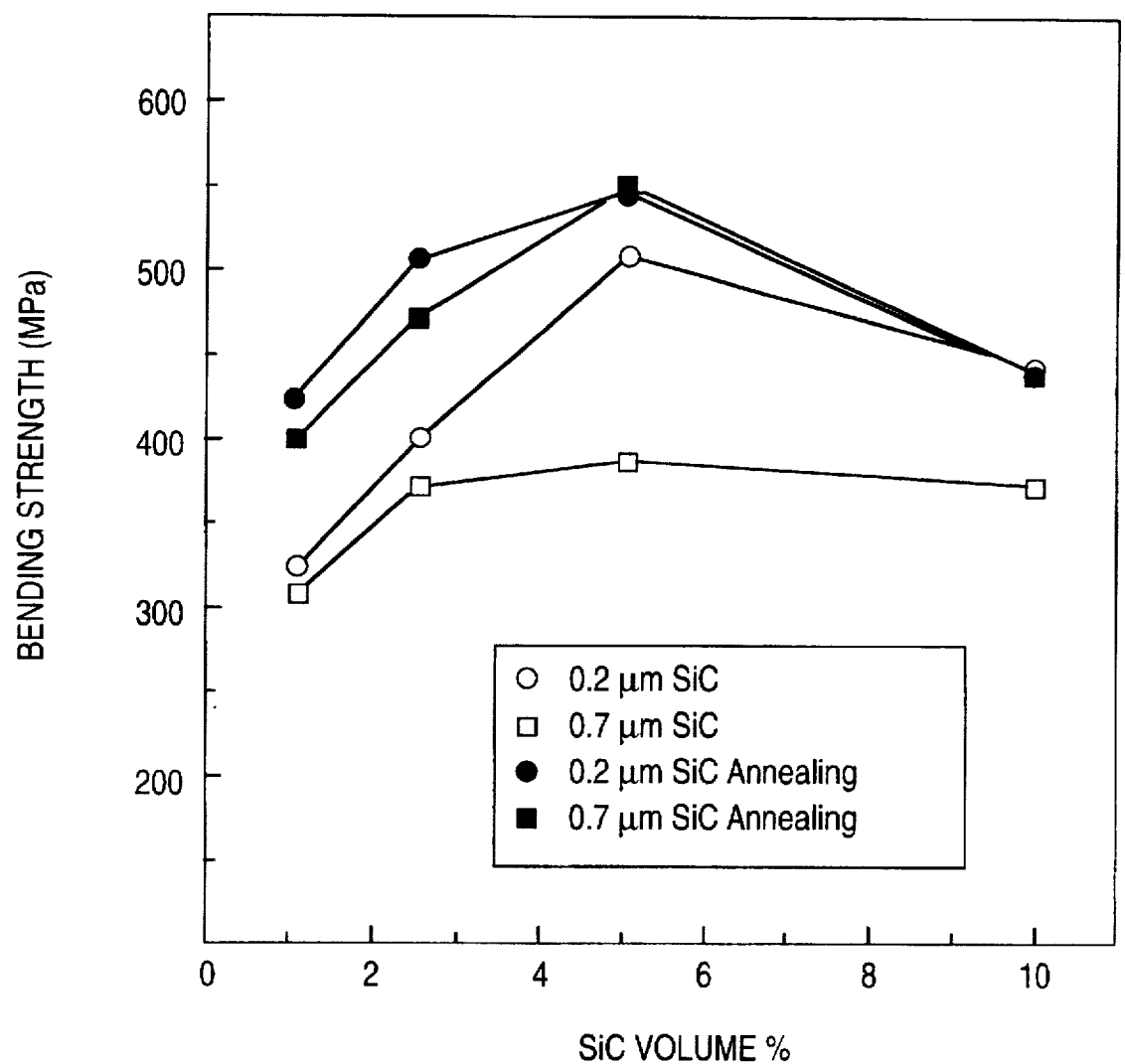
FIG. 1 is a graphical view, illustrating the bending strengths of alumina-silicon carbide nanocomposites of this invention as a function of the content of alumina-silicon carbides.

Generally, a nanocomposite is a ceramic material, which has an improved strength, toughness and high temperature property with fine particles of a diameter of 50 to several hundred nanometer being positioned in the grains of a matrix.

An alumina-silicon carbide nanocomposite for ball bonding capillaries of a wire bonding device in accordance with the present invention is comprised of 93–98 volume percent of α-alumina and 2–7 volume percent of β-silicon carbide, preferably, 94–96 volume percent of α-alumina and 4–6 volume percent of β-silicon carbide.

When the content of the β-silicon carbide is less than 2 volume percent, the toughness of the nanocomposite is higher than 4 $MPam^{1/2}$, whereas its bending strength is rapidly reduced to less than 340 MPa, thus being not preferable. Also, when the content of the β-silicon carbide is more than 7 volume percent, a desired toughness of the nanocomposite is maintained, whereas its bending strength tends to reduce because of lower sintering density.

In the alumina-silicon carbide nanocomposite of this invention, the α-alumina has an average diameter of 0.1–0.3 μm and the β-silicon carbide has an average diameter of 0.1–1.5 μm. Preferably, the α-alumina has an average diameter of 0.15–0.25 μm and the β-silicon carbide has an average diameter of 0.15–0.25 μm.

When the average diameter of the α-alumina is smaller than 0.1 μm, the toughness of the nanocomposite is not improved. Meanwhile, when the average diameter of the α-alumina is larger than 0.3 μm, the strength of the nanocomposite is badly affected due to the increase of its particle size.

On the other hand, when the average diameter of the β-silicon carbide is smaller than 0.1 μm, the toughness and strength of the nanocomposite are deteriorated. Meanwhile, when the average diameter of the β-silicon carbide is larger than 1.5 μm, the strength of the nanocomposite is reduced because it is impossible to form a uniform and dense structure.

In mechanical properties of the alumina-silicon carbide nanocomposite of this invention, the bending strength is 340–550 MPa and the toughness is 3.3–4.1 MPam$^{1/2}$. Preferably, the bending strength is 460–520 MPa and the toughness is 3.5–3.7 MPam$^{1/2}$, more preferably, the bending strength is 510–550 MPa and the toughness is 3.5–3.7 MPam$^{1/2}$.

The method of manufacturing the above alumina-silicon carbide nanocomposite comprises the steps of mechanically mixing an alumina with a silicon carbide by means of a ball milling process, drying the dispersal organic solvent of the mixture, filtering the dried powder using a screen, pressurizing the filtered powder in a mold so as to preform the filtered powder, forming the preformed material by a cold hydrostatic pressurizing process, sintering the formed material and selectively annealing the sintered material.

First, 93–98 volume percent of α-alumina, having an average diameter of 0.1–0.3 μm, is mechanically mixed with 2–7 volume percent of β-silicon carbide, having an average diameter 0.1–1.5 μm, in a dispersal organic solvent such as a methanol or ethanol for 0.5–4 hours through a ball milling process. The strength and toughness of the resulting nanocomposite are not affected by the position of the silicon carbide in the alumina grain or grain boundary irrespective of the processing time of the ball milling process. Thus, the time of the ball milling process is not limited, however, the process is preferably performed for one hour.

Second, the mixture is dried so as to eliminate the moisture and dispersal organic solvent used in the mixing step. Preferably, the mixture is dried with a rotating evaporator so as to prevent any deposition of alumina particles due to a difference in the density in a slurry.

The filtering process is carried out with a screen of 120 mesh, thus eliminating cohesive materials from the dried powder.

Thereafter, the filtered powder is filled into a hard metal mold and is pressurized at a pressure of 2500–3500 psi, thus being preformed. When the filtered powder is pressurized at a pressure of less than 2500 psi, the desired sintering density may be not obtained. Meanwhile, even though the pressurizing pressure for the filtered powder is higher than 3500 psi, it is impossible to expect any further improvement of the processing effect in proportion to such a high pressure.

The preformed material is, thereafter, formed at a super-high pressure of 45000–55000 psi for 1.5–3 minutes through a cold hydrostatic pressurizing process. At such a super-high pressure, both the alumina and the silicon carbide are compressed uniformly and densely.

Finally, the sintering process for the formed material is carried out at the temperature of 1600–1800° C. for 3–5 hours under an inert gas atmosphere such as argon or nitrogen, etc. When the sintering point for the formed material is lower than 1600° C., the sintering process cannot be appropriately carried out. Meanwhile, the sintering point of higher than 1800° C. is not preferable because it is impossible to expect any further improvement of the processing effect in proportion to such a high temperature. Furthermore, such a high sintering temperature may quickly reduce the strength of the nanocomposite due to the unexpected increase of particle size.

Also, an annealing process may be selectively carried out. Such annealing process for the sintered material is carried out at a temperature of 1250–1350° C. for 1.5–2.5 hours through a heat treatment process. As a result of the heat treatment, the strength of the nanocomposite is remarkably increased because of the healing effect of surface defects. However, such an annealing process barely improves the rupture toughness of the nanocomposite.

EXAMPLE 1

Sintering At Atmospheric Pressure

Figure 4:
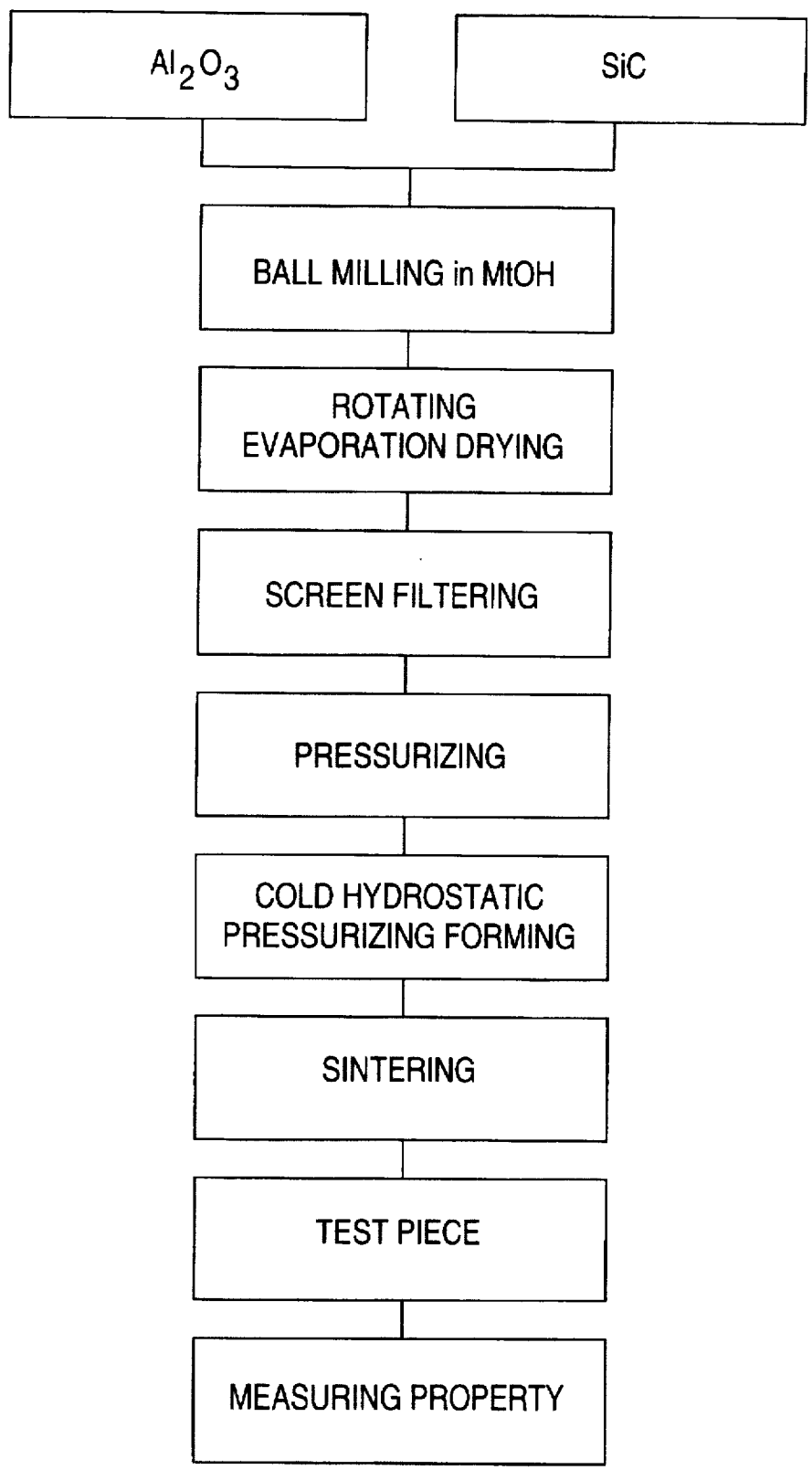
FIG. 4 is a flowchart illustrating the manufacture of an alumina-silicon carbide nanocomposite in accordance with a preferred method of the present invention.

An alumina-silicon carbide nanocomposite of this invention was produced with the following starting materials in accordance with the flowchart of FIG. 4.

Starting Materials

α-alumina having an average diameter 0.2 μm (99.99%, Grade TM-RD, Taimeri Co.)

High fine β-silicon carbide having an average diameter 0.2 μm (Grade MSC-20, Mitsui Toatsu Chemicals, Inc.)

Zirconia balls, alumina powder and silicon carbide powder were charged into a polyurethane vessel of 500 cc. Next, the mixture was milled through a ball milling process for 1–3 hours with a dispersal methyl alcohol. In this case, the amount of the silicon carbides are 1, 2.5, 5 and 10 volume percent. The mixture was dried with a rotating evaporator so as to prevent any deposition caused by the density difference between the alumina and silicon carbide. Thereafter, the dried powder was filtered with the screen.

The filtered powder was filled into the hard metal mold of 32 mm×32 mm×40 mm and was pressurized at the pressure of 3000 psi, thus being preformed. Next, the preformed material was formed through a cold hydrostatic pressurizing process at a pressure of 50000 psi for 2 minutes.

The formed material was sintered using a high temperature vacuum furnace (Centorr Co. U.S.A.) at a temperature of 1700° C. and at an atmospheric pressure for 4 hours under the argon gas atmosphere. The temperature was increased up to the maximum temperature by 10° C. per minute, and a cooling process was carried out in the furnace. The sintered material was cut into a plurality of bars of 3 mm×3 mm×25 mm. Thereafter, the edge and surface of a test piece were machined by # 600 and # 800 diamond wheels, respectively.

The three point bending strength of the test piece was measured with an omnipotent tester (Shimadzu Co. Japan), the measured results are illustrated in FIG. 1.

Figure 2:
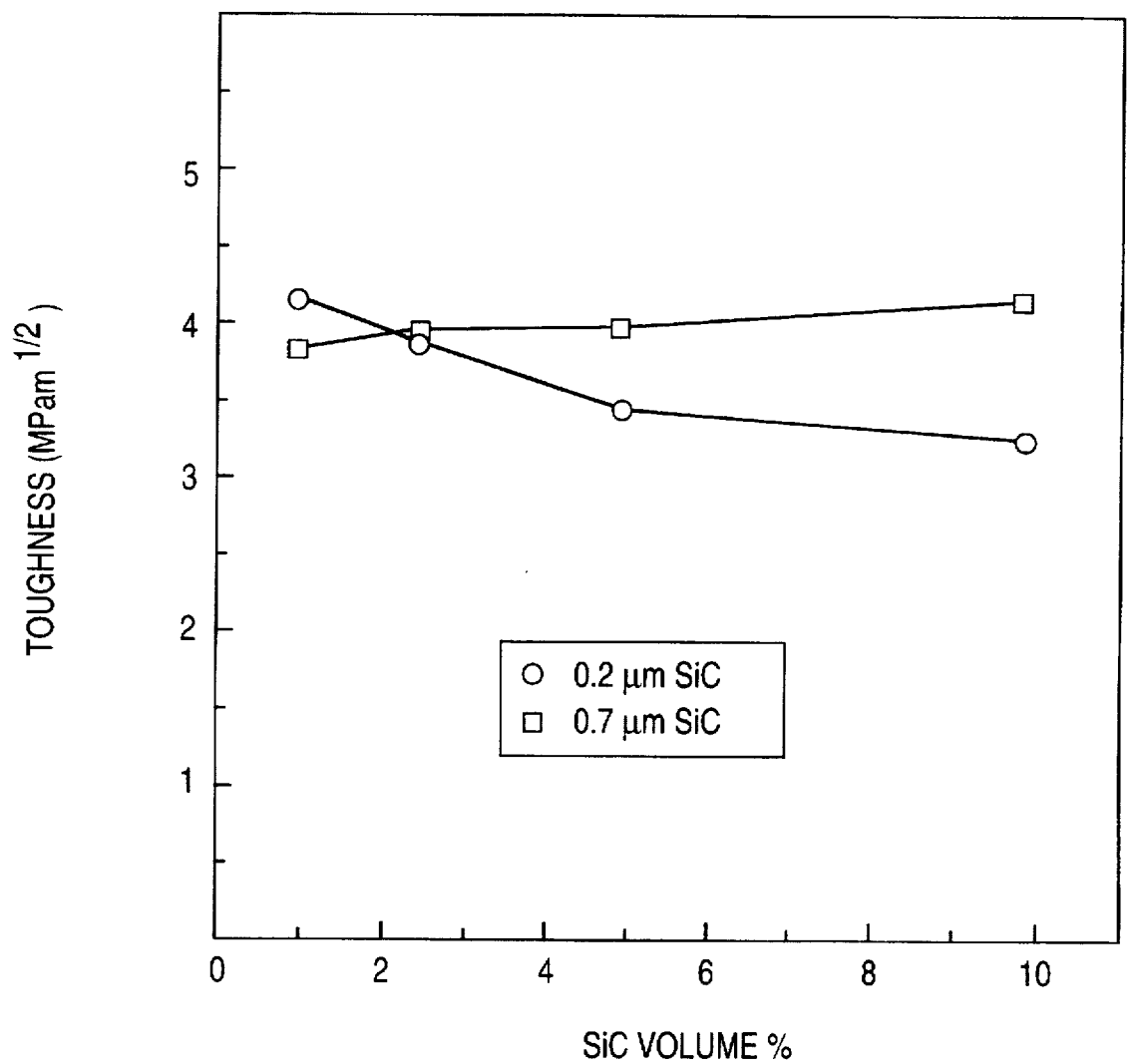
FIG. 2 is a graphical view, illustrating the rupture toughness of alumina-silicon carbide nanocomposites of this invention as a function of the content of alumina-silicon carbides.

The rupture toughness of the test piece was measured according to an indentation microfracture method with Vicker's hardness, the measuring result is illustrated in FIG. 2.

Figure 3:
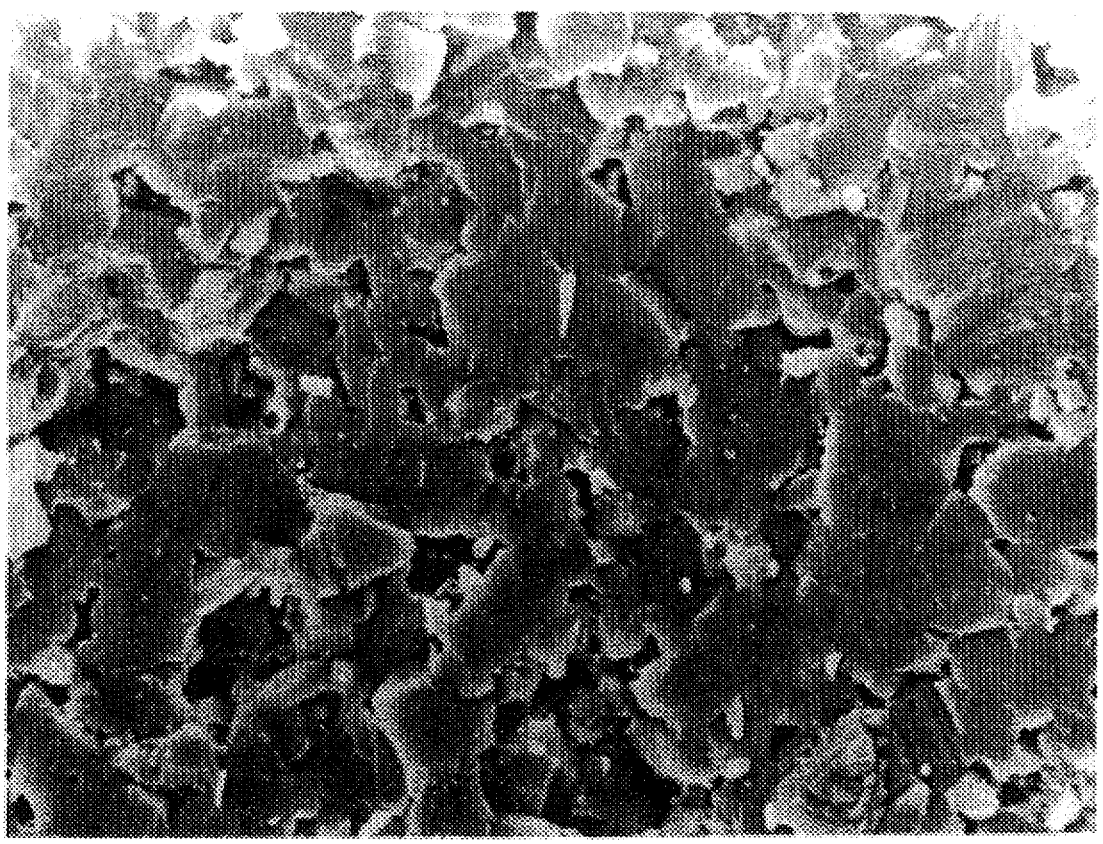
FIG. 3 is a SEM (scanning electron microscope) photograph of the fracture surface of the nanocomposite in accordance with the present invention.

The SEM (scanning electron microscope) photograph of the fracture surface of the nanocomposite including 5 volume percent of β-silicon carbide is shown in FIG. 3, and the structure of the nanocomposite is very dense and uniform as shown in FIG. 3.

EXAMPLE 2

Sintering At Atmospheric Pressure

In this Example 2, an alumina-silicon carbide nanocomposite was manufactured in the same manner as that described for Example 1, except for a high fine β-silicon carbide having an average diameter 0.7 μm (Grade A-20, H. C. Starck Co., Inc., Germany) as starting materials. The bending strength and the rupture toughness of the test piece were measured in the same manner as Example 1, the measured results are illustrated in FIG. 1 and 2.

EXAMPLE 3

Annealing After Sintering At Atmospheric Pressure

An alumina-silicon carbide nanocomposite was manufactured using starting materials in the same manner as in Example 1, except that the sintered material was annealed at a temperature of 1300° C. for 2 hours after the material was sintered under the argon gas atmosphere and at a temperature of 1700° C. for 4 hours. The bending strength and the fracture toughness of the test piece were measured in the same manner as in Example 1, the measured results are illustrated in FIG. 1.

EXAMPLE 4

Annealing After Sintering At Atmospheric Pressure

An alumina-silicon carbide nanocomposite was manufactured using the same starting materials in the same manner as in Example 2, except that the sintered material was annealed at a temperature of 1300° C. for 2 hours after the material was sintered under the argon gas atmosphere and at a temperature of 1700° C. for 4 hours. The bending strength and rupture toughness of a test piece were measured in the same manner as that described for Example 1, and the measured results are illustrated in FIG. 1.

COMPARATIVE EXAMPLE 1

Sintering At High Temperature And Pressure

Starting Materials

α-alumina having an average diameter 0.2 μm (99.995%, Grade AKP-50, Sumitomo Chemicals, Co., Ltd.)

High fine α-silicon carbide having an average diameter 0.7 μm (Grade A-10, H. C. Starck Co., Inc., Germany)

Alumina balls, alumina powder and silicon carbide powder were filled into a polyurethane jar of 1800 cc. Next, the mixture was milled by a ball milling process for 24 hours with a dispersal methyl alcohol. The amount of the silicon carbide was 5 volume percent. The milled slurry was dried with a dryer at a temperature of 70° C., thereafter, the dried powder was filtered with the # 40 screen.

The filtered powder was charged into a graphite mold of 40 mm×40 mm and was sintered with a graphite punch. The sintering process was carried out using a high temperature pressure furnace (Electrofuel, Canada) at a temperature of 1600–1900° C. and under vacuum atmosphere of 38 MPa for 30 minutes. The temperature was gradually increased to the maximum temperature for one hour. The cooling process was slowly carried out while slowly reducing the temperature from the sintering temperature to 800° C. for 30 minutes. Thereafter, the furnace cooling was executed at temperatures of less than 800° C. The sintered material was cut into a plurality of bars of 3 mm×3 mm×25 mm. Thereafter, the edge and surface of a test piece were machined by # 600 and # 800 diamond wheels, respectively.

The bending strength and rupture toughness of a test piece were measured in the same manner and with the same equipment as in Example 1. The test piece had a comparatively good strength of 360 MPa, however, the rupture toughness was 2.5 MPam$^{1/2}$, which is less than that of the sintered material of the pure alumina.

Such an improved strength is assumed to be caused by the fact that the grain boundary is strengthened due to the compressed stress according to the coefficient difference between the sintering density and the thermal expansion. Meanwhile, the reduced rupture toughness is assumed to be caused by the reduction of the bridge effect of a grain crack.

As mentioned above, the present invention provides an alumina-silicon carbide nanocomposite for ball bonding capillaries of a wire bonding device. The nanocomposite of this invention comprises 98–93 volume percent of α-alumina, having the average diameter of 0.1–0.3 μm, and 2–7 volume percent of β-silicon carbide, having the average diameter of 0.1–1.5 μm. This alumina-silicon carbide nanocomposite has a bending strength of 340–550 MPa and a toughness of 3.3–4.1 MPam$^{1/2}$. Therefore, the nanocomposite of this invention is preferably used for the material of ball bonding capillaries of a wire bonding device because the strength and toughness of the nanocomposite in accordance with this invention is higher than those of the pure sintered alumina. Also, the present invention can provide a reliable and durable capillary made of such a nanocomposite, thereby reducing the manufacturing cost of semiconductor packages.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing an alumina-silicon carbide nanocomposite for ball bonding capillaries of a wire bonding device, comprising the steps of:

mechanically mixing 93–98 volume percent of α-alumina, having an average diameter of 0.1–0.3 μm, and 2–7 volume percent of β-silicon carbide, having an average diameter 0.1–1.5 μm, in a dispersal organic solvent for 0.5–4 hours through a ball milling process;

drying said dispersal organic solvent of the mixture, thus forming dried powder;

filtering said dried powder by a screen;

pressurizing the filtered powder in a mold at a pressure of 2500–3500 psi, thus preforming the filtered powder into a preformed material;

forming the preformed material at a pressure of 45000–55000 psi for 1.5–3 minutes through a cold hydrostatic pressurizing process, thus forming a formed material; and sintering the formed material at a temperature of 1600–1800° C. and at atmospheric pressure for 3–5 hours in an inert atmosphere, thus forming an alumina-silicon carbide nanocomposite having a bending strength of 340–550 MPa and a toughness of 3.3–4.1 MPam$^{1/2}$.

2. The method as claimed in claim 1, wherein the content and average diameter of said α-alumina are 94–96 volume percent and 0.15–0.25 μm respectively, and the content and average diameter of said β-silicon carbide are 4–6 volume percent and 0.15–0.25 μm respectively, so that the bending strength and toughness of said alumina-silicon carbide nanocomposite are 460–520 MPa and 3.5–3.7 MPam$^{1/2}$, respectively.

3. The method as claimed in claim 1, further comprising the step of annealing said sintered material at a temperature of 1250–1350° C. for 1.5–2.5 hours after the sintering step, thus forming an alumina-silicon carbide nanocomposite having a bending strength of 510–550 MPa and a toughness of 3.5–3.7 MPam$^{1/2}$.

4. The method as claimed in claim 1, wherein said dispersal organic solvent used in the drying step is a methanol or ethanol, and said inert atmosphere used in the sintering step is an argon or nitrogen gas atmosphere.

* * * * *